United States Patent [19]

Okura

[11] 4,416,527

[45] Nov. 22, 1983

[54] APPARATUS OF PREVENTING BOUND OF DIAPHRAGM BLADES IN CAMERA

[75] Inventor: Zenichi Okura, Ichikawashi, Japan

[73] Assignee: Asahi Kogaku Kogyo Kabushiki Kaisha, Tokyo, Japan

[21] Appl. No.: 385,079

[22] Filed: Jun. 4, 1982

[30] Foreign Application Priority Data

Jun. 22, 1981 [JP] Japan .................................. 56-92027

[51] Int. Cl.³ .............................................. G03B 9/06
[52] U.S. Cl. .................................... 354/272; 354/274
[58] Field of Search ............... 354/270, 271, 272, 274, 354/252

[56] References Cited

U.S. PATENT DOCUMENTS 3,298,295  1/1967  Schlapp ............................... 354/274
3,864,714  2/1975  Sasaki .................................. 354/272
4,319,824  3/1982  Rossmann ........................... 354/272

Primary Examiner—John Gonzales
Attorney, Agent, or Firm—Merchant, Gould, Smith, Edell, Welter & Schmidt

[57] ABSTRACT

In a diaphragm actuator of a lens of a camera comprising a stationary support ring, a blade ring which is rotatable in the support ring and which has pivotable diaphragm blades movably connected to the support ring so that the rotational movement of the blade ring causes the diaphragm blades to open and close, and a limiting member which comes into contact with the blade ring to limit the movement of the blade ring when the diaphragm blades are closed, the improvement comprising an additional ring rotatable relative to the support ring for preventing the blade ring from bounding when the blade ring contacts with the limiting member, which additional ring comes into contact with the balde ring to brake the movement of the blade ring immediately before the blade ring contacts with the limiting member.

13 Claims, 6 Drawing Figures

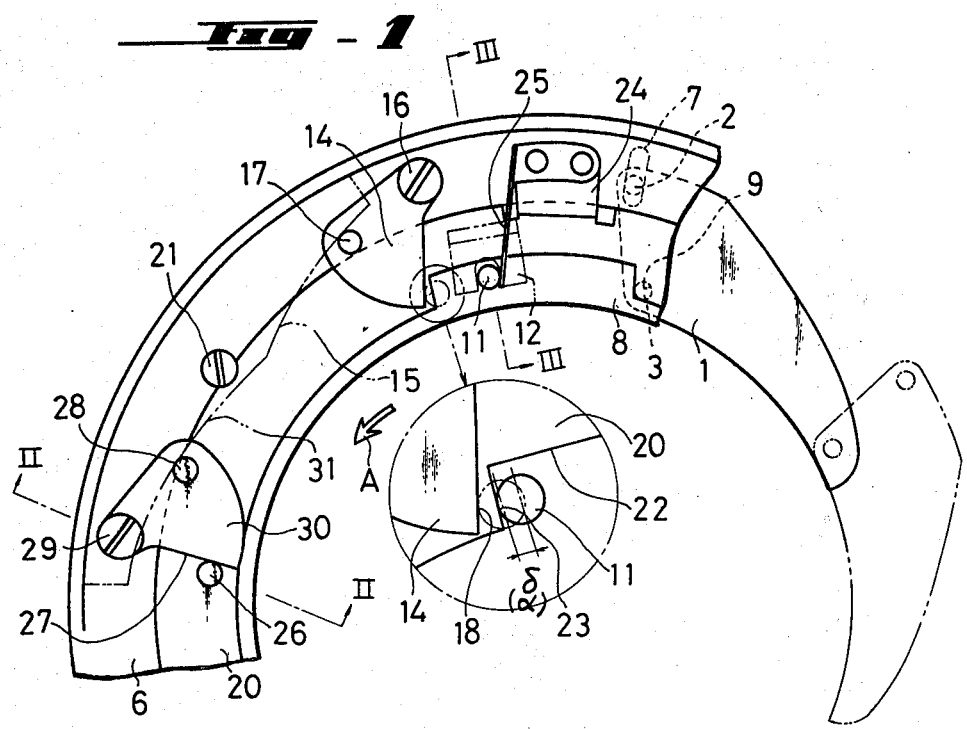
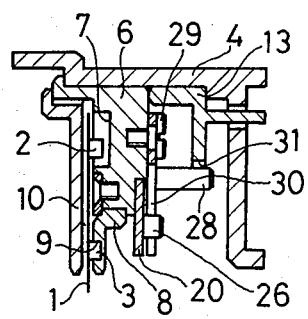 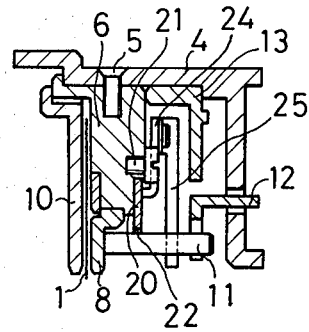

APPARATUS OF PREVENTING BOUND OF DIAPHRAGM BLADES IN CAMERA

This invention relates to a diaphragm mechanism of an interchangeable lens of a camera, and, in particular, to an apparatus for preventing diaphragm blades (or leaves) from bounding when the diaphragm opening (aperture) is rapidly reduced during a diaphragm operation.

A so-called "pre-set automatic diaphragm" is widely used today for a single-lens reflex camera, in which the diaphragm is usually at full aperture. The diaphragm opening is reduced at high speed to a predetermined aperture "F number" when a shutter provided on a camera body is actuated. This kind of automatic pre-set diaphragm mechanism essentially has a support ring which carries the diaphragm blades thereon and a rotatable blade ring which rotates relative to the support ring to increase or decrease the size of the diaphragm opening (aperture). The blade ring usually maintains the diaphragm at full aperture. When the shutter is operated, the blade ring is rotated by an angle corresponding to a predetermined F number, within a very short time interval. The rotational movement of the blade ring is stopped by an angular displacement limiting member. That is, the angular displacement of the blade ring continues until it comes into contact with the limiting member. It should be noted that since the reduction of the diaphragm opening must be completed within an extremely short space of time, before the shutter is released, the blade ring is rotated at high speed. Therefore, when the blade ring comes into collision with the limiting member which is immovable, the blade ring tends to bound or rebound, thus resulting in oscillation of the diaphragm blades. By the oscillation of the diaphragm blades, not only the size of the diaphragm opening can be neither accurately nor stably controlled, but also no uniform travel of the diaphragm blades can be obtained.

The object of the present invention is to prevent the diaphragm blades from bounding or rebounding.

In order to achieve the object, according to the present invention, a bound preventing ring is rotatably arranged in a stationary lens barrel. The bound preventing ring is engaged by the blade ring immediately before the blade ring comes into collision with the angular displacement limiting member, so that all of or part of kinematic energy of a diaphragm actuating device including the blade ring can be absorbed by bound preventing ring and converted to the movement of the latter, thus resulting in no occurrence of a bound of the diaphragm blades.

The invention will be described below in detail, with reference to the accompanying drawings, in which FIG. 1 is a front elevational view of a part of a disphragm mechanism of a camera, according to the present invention;

FIGS. 2 and 3 are sectional views taken along the line II—II and the line III—III in FIG. 1, respectively;

Figure 4:
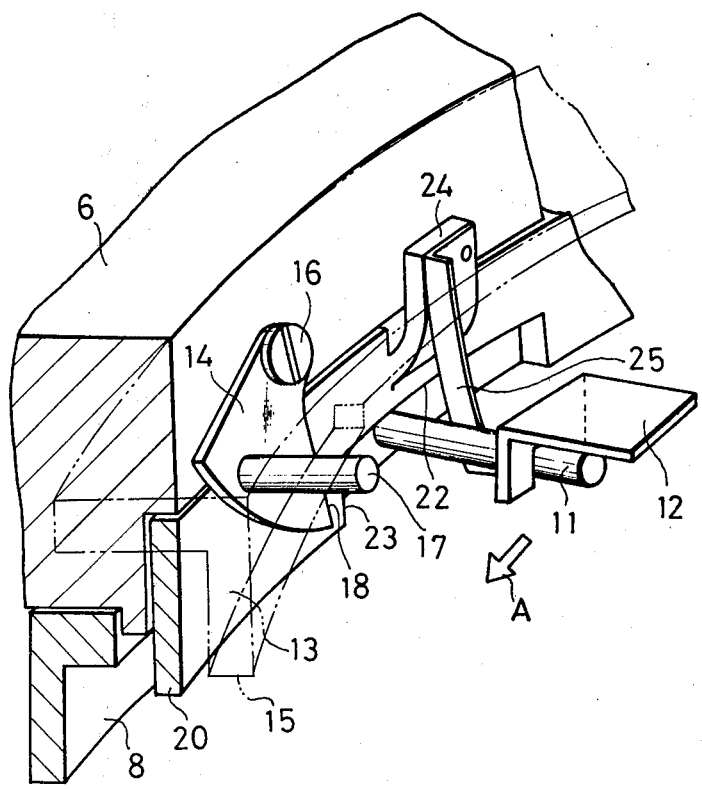
FIG. 4 is a partial perspective view of the diaphragm mechanism shown in FIG. 1.
Figure 5:
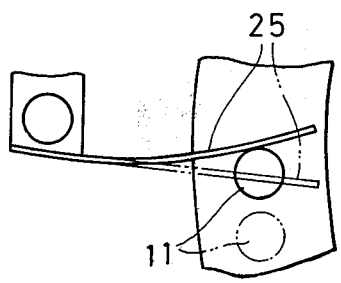
FIG. 5 is an enlarged front elevational view of a pin for rotating a blade ring and a return spring of a bound preventing ring; and, FIG. 6 is a diagram representing one example of the movement of the diaphragm blades.

Each of diaphragm blades 1 (only two diaphragm blades are shown) has an outer pin 2 and an inner pivot pin 3. The outer pins 2 are movably fitted in corresponding elongated slots 7 which are formed in a diaphragm blade support ring 6 which is, in turn, rigidly connected to a stationary lens barrel 4, by means of set screws 5. The pivot pins 3 are mounted in corresponding holes 9 of a rotatable blade ring 8 which is rotatably fitted in the inner periphery of the support ring 6. Usually, more than six diaphragm blades 1 are provided at a predetermined angular space so that the rotation of the blade ring 8 causes the diaphragm blades 1 to pivot about the respective pivot pins 3 in order to decrease or increase the diaphragm opening, i.e., the lens aperture. The blades 1 are held between the support ring 6 and the blade ring 8, by means of an annular keep plate 10.

The blade ring 8 has a drive pin 11 which projects therefrom perpendicularly to a plane of the blade ring 8 and which is engaged by a diaphragm actuation member 12 adapted to rotate the blade ring 8. The diaphragm actuation member 12 is continuously spring-biased so that the blade ring 8 is kept at an initial position in which the blades 1 open. The diaphragm actuation member 12 is driven and rotated in a way perse known when a shutter of a camera body (not shown) operates. The rotation of the actuation member 12 is transmitted to the blade ring 8 by means of the drive pin 11, so that the blade ring 8 rotates in a direction designated by an arrow A in FIGS. 1 and 4. The drive force applied to the actuation member 12 is a small springy force so that when an external resistance force against the rotation is applied to the blade ring 8, the actuation member 12 cannot move.

The angular displacement of the blade ring 8 is limited to a valve corresponding to an aperture "F number" which is predetermined by a diaphragm adjusting ring 13 rotatable relative to the support an angular displacement control lever (first control lever) 14. The adjusting ring 13 which rotates together with a scale ring (not shown) indicating the "F number" is provided, on its inner periphery, with a first cam surface 15. The control lever 14 which is rotatable about a shaft 16 connected to the support ring 6 has a stop pin 17 which bears against the cam surface 15 and a stop surface 18 which bears against the drive pin 11. The control lever 14 is continuously biased by a spring (not shown) in one direction so that the stop pin 17 is continuously pressed against the cam surface 15. Therefore, when the adjusting ring 13 is rotated by means of the scale ring, to move the contact position between the stop pin 17 and the cam surface 15, the control lever 14 is rotated correspondingly, so that the distance between the stop surface 18 of the control lever 14 and the drive pin 11 at its inital position varies, thus resulting in an adjustment of the angular displacement of the blade ring 8. A predetermined size of the diaphragm opening can be thus obtained.

The above mentioned construction is that of a conventional diaphragm mechanism of an interchangeable lens.

According to the present invention, the provision is made of a bound preventing ring 20 which is fitted in an inner recessed portion of the support ring 6 and which is rotatable about an optical axis. Set screws 21 are screwed in the support ring 6 to prevent the bound preventing ring 20 according to the present invention from coming out of the recessed portion of the support ring 6. The bound preventing ring 20 is provided, on its inner periphery, a recess 22 through which the drive pin 11 extends. The recess 22 has at one end, an abutment surface 23 which comes into contact with the drive pin 11. The bound preventing ring 20 comes into collision with the drive pin 11 of the blade ring 8 immediately before the drive pin 11 comes into collision with the stop surface 18 of the lever 14.

The bound preventing ring 20 has a spring mount 24 to which one end of a return spring 25 is attached. The spring mount 24 can be formed, for example, by bending a part of the ring 20. The return spring 25 bears against the drive pin 11 to give a return force in a direction opposite to the arrow A to the ring 20.

The abutment surface 23 of the bound preventing ring 20 to which the return force is continuously applied, as mentioned above is located so that the drive pin 11 always comes into contact with the abutment surface 23 prior to contact with the stop surface 18, independently of the angular position of the control lever 14. For this purpose, positioning means is provided, which includes a control pin 26 projecting from the bound preventing ring 20 in a direction perpendicular to a plane of the ring 20, a return movement control lever (second control lever) 30 having an abutment surface 27 which is in contact with the control pin 26 and a stop pin 28, said control lever 30 being rotatable about a pivot shaft 29 connected to the support ring 6, and a second cam surface 31 formed on the diaphragm adjusting ring 13 and engaged by the stop in 28. When the control lever 14 is rotated about the shaft 16 by the movement of the adjusting ring 13, the control lever 30 is also rotated about the shaft 29 by the spring force of the return spring 25, since the contact point between the stop pin 28 and the cam surface 31 is displaced by the movement of the adjusting ring 13. That is, when the control lever 14 is rotated about the shaft 16 in a counterclockwise direction in FIG. 1, the control lever 30 is rotated about the shaft 29 in the same direction as the control lever 14, thus resulting the rotation of the bound preventing ring 20 in a clockwise direction, in FIG. 1, by the spring force of the return spring. Because of the rotation of the bound preventing ring 20 which occurs simultaneously with the rotation of the control lever 14, the abutment surface 23 of the bound preventing ring 20 is always positioned adjacent to the drive pin 11 nearer than the stop surface 18 of the control lever 14 by the distance $\delta$ (which is preferably below 0.5 mm) or by the angular displacement $\alpha$, so that the drive pin 11 always comes first into contact with the abutment surface 23 rather than the stop surface 18.

As can be understood from the above description, when the diaphragm blades 1 are closed by the rotation of the blade ring 8 which is, in turn, driven by the actuation member 12, the drive pin 11 first comes into collision with the abutment surface 23 of the bound preventing ring 20, so that the blade ring 8 is subject to a resistance against the rotation and a large part of the kinetic energy of the blade ring 8 is absorbed by the bound preventing ring 20 which is, then, rotated about the optical axis by the kinematic energy. After that, the blade ring 8 which has a kinematic energy thus decreased comes into contact with the stop surface 18 of the control lever 14. Thus, when the blade ring 8 comes into contact with the stop surface 18, no or almost no bound (rebound) of the blade ring 18, and, accordingly, of the diaphragm blades 1 occurs.

Figure 6:
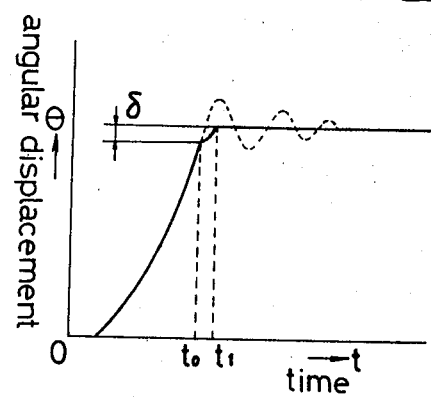

FIG. 6 shows a relationship between the angular displacement $\theta$ of the diaphragm blades and the time t.

As can be seen in FIG. 6, it has been experimentally confirmed that the blade ring 8 did not rebound when it came into contact with the stop surface 18 at the time $t_1$. It was a matter of course that the speed of the movement of the blade ring 8 was decreased when it collided with the abutment surface 23 at the time $t_0$. In case of no provision of the bound preventing ring 20 unlike the present invention, the blade ring 8 would rebound, as shown by a dotted line.

The rotation of the bound preventing ring 20 which occurs after the drive pin 11 collides with the abutment surface 23 of the ring 20 is stopped when the return spring 25 comes into contact with the drive pin 11 or when the spring mount 24 comes into contact with the shaft 16 of the control lever 14. When the actuation member 12 is returned to its original position, the bound preventing ring 20 and the blade ring 8 are also returned to their initial position.

The brake force against the movement of the blade ring due to the bound preventing ring 20 increases as the inertial mass of the ring 20 increases. However, if the ring 20 has a large inertial mass, there is a large possibility that the ring 20 itself bounds when the drive pin 11 comes into collision with the abutment surface 23 of the ring 20. In order to obtain an optimum brake effect which can be brought by the bound preventing ring 20 without an occurrence of rebound thereof, the inertial mass of the ring 20 is preferably substantially identical to that of a diaphragm actuating assembly which includes the blade ring 8 and elements associated therewith. In principle, when the inertial masses of the ring 20 and the diaphragm actuating assembly are identical to each other, the kinematic energy of the blade ring 8 is first completely absorbed by the bound preventing ring 20 when the drive pin 11 comes into collision with the abutment surface 23 of the ring 20. That is, the kinematic energy of the blade ring 8 is all converted to the kinematic energy of the bound preventing ring 20. Further rotational movement of the blade ring 8 over the small distance $\delta$ is caused by the actuation member 12 which continues moving until the drive pin 11 of the blade ring 8 comes into collision with the stop surface 18 of the control lever 14. It will be easily understood that, if the inertial mass of the bound preventing ring 20 is smaller than that of the diaphragm actuating assembly, only a part of the kinematic energy of the blade ring 8 is absorbed by the bound preventing ring 20.

In the illustrated embodiment, the single drive pin 11 successively comes into contact with both the bound preventing ring 20 and the control lever 14. However, it is also possible to provide a bound preventing pin in addition to the drive pin 11 on the blade ring 8, so that the additional pin (bound preventing pin) comes into contact with the abutment surface 23 of the bound preventing ring 20 immediately before the drive pin 11 comes into contact with the stop surface 18 of the lever 14. The separate two pins, i.e., the drive pin and the bound preventing pin for the control lever and the bound preventing ring, respectively provide the same technical effect as the illustrated and above mentioned embodiment.

As can be understood from the above discussion, according to the present invention, since the blade ring for opening and closing the diaphragm blades comes into collision with the bound preventing ring immediately before the blade ring comes into collision with the angular displacement limiting member which controls the angular displacement of the blade ring in accordance with aperture F number, all of or part of the kinematic energy of the blade ring is absorbed by the bound preventing ring and, accordingly, there is no or almost no occurrence of bound of the diaphragm blades due to the collision of the blade ring with the angular displacement limiting member at high speed. This increases an accuracy of the diaphragm opening, improves a stability of the diaphragm operation, and provides a uniform travel of the diaphragm blades.

I claim:

1. In a diaphragm actuator of a lens of a camera, comprising a stationary support ring, a blade ring which is rotatable in and relative to the support ring and which has a plurality of diaphragm blades rotatable thereto by means of pivots, said diaphragm blades being movably connected to said support ring so that the rotational movement of the blade ring relative to the support ring causes the diaphragm blades to open and close in order to control a diaphragm opening defined by the diaphragm blades, and an angular displacement limiting member which limits the angular displacement of the blade ring to control the diaphragm opening in accordance with a predetermined aperture F number of the associated lens, said blade ring being rotated until it is brought into contact with the limiting member when the diaphragm blades are closed, the improvement comprising an apparatus for preventing the blade ring from bounding when the blade ring comes into contact with the limiting member, said bound preventing apparatus comprising a bound preventing ring which is rotatable relative to the support ring and which comes into contact with the blade ring to brake the movement of the blade ring immediately before the blade ring comes into contact with the limiting member.

2. An apparatus according to claim 1, wherein said blade ring comprises a drive pin which is operatively connected to an actuation member of the diaphragm actuator to rotate the blade ring and which can be engaged by said limiting member to limit the rotational movement of the blade ring.

3. An apparatus according to claim 2, wherein said limiting member comprises a first control lever with a stop surface, the rotational movement of said blade ring being stopped when said drive pin comes into contact with the stop surface of the control lever.

4. An apparatus according to claim 2, wherein said limiting member is rotatably connected to the support ring so as to adjust the angular position of the stop surface.

5. An apparatus according to claim 4, further comprising an adjusting ring which has a first cam surface bearing against the first control lever to maintain the latter at a fixed position depending on the F number.

6. An apparatus according to claim 5, wherein said adjusting ring is rotatable relative to the support ring to adjust a contact point between the cam surface of the adjusting ring and the control lever.

7. An apparatus according to claim 6, wherein said control lever has a stop pin which always bears against the cam surface of the adjusting ring.

8. An apparatus according to claim 3, wherein said bound preventing ring comprises a recess through which said drive pin extends and which is provided, on its one end, with an abutment surface which is located adjacent to the drive pin nearer than said stop surface of the first control lever by a slight distance, so that the drive pin comes into contact with the abutment surface of the bound preventing ring immediately before the drive pin comes into contact with the stop surface of the control lever, when the blade ring is rotated to close the diaphragm blades.

9. An apparatus according to claim 8, further comprising means for adjusting the position of the abutment surface of the bound preventing ring relative to the stop surface of the first control lever when the adjusting ring is actuated.

10. An apparatus according to claim 9, wherein said adjusting means comprises a second control lever pivoted to the support ring, a second cam surface which bears against the second control lever, and a control pin on the bound preventing ring for transmitting the movement of the second control lever to the bound preventing ring.

11. An apparatus according to claim 10, wherein said second cam surface is formed on the adjusting ring.

12. An apparatus according to claim 2, further comprising a return spring on the bound preventing ring which bears against the drive pin to bias the bound preventing ring to its initial position.

13. An apparatus according to claim 1, 2, 3, 4, 5, 6, 7, 8, 9, 10, 11, or 12, wherein the inertial mass of the bound preventing ring is substantially equal to that of an assembly including the blade ring and elements carried thereon.

* * * * *